(12) United States Patent
Yebka et al.

(10) Patent No.: US 12,158,380 B2
(45) Date of Patent: Dec. 3, 2024

(54) MONITORING AND DETECTION OF BATTERY SWELLING

(71) Applicant: Lenovo (United States) Inc., Morrisville, NC (US)

(72) Inventors: Bouziane Yebka, Apex, NC (US); Tin-Lup Wong, Chapel Hill, NC (US); Philip John Jakes, Durham, NC (US); Jeremy Robert Carlson, Cary, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 474 days.

(21) Appl. No.: 17/560,774

(22) Filed: Dec. 23, 2021

(65) Prior Publication Data

US 2023/0204434 A1    Jun. 29, 2023

(51) Int. Cl.
G01K 7/16      (2006.01)
G01K 1/02      (2021.01)
G01K 1/024     (2021.01)
G01K 3/00      (2006.01)
H01M 10/44     (2006.01)
H01M 10/48     (2006.01)
H02J 7/00      (2006.01)

(52) U.S. Cl.
CPC .............. *G01K 7/16* (2013.01); *G01K 1/024* (2013.01); *G01K 3/005* (2013.01); *H01M 10/443* (2013.01); *H01M 10/486* (2013.01); *H02J 7/0047* (2013.01)

(58) Field of Classification Search
CPC .......... G01K 7/16; G01K 1/024; G01K 3/005; H01M 10/443; H01M 10/486; H02J 7/0047
See application file for complete search history.

(56) References Cited

U.S. PATENT DOCUMENTS

| | | | | |
|---|---|---|---|---|
| 3,940,679 | A  * | 2/1976 | Brandwein | .......... G01R 31/378 |
| | | | | 324/431 |
| 4,234,839 | A  * | 11/1980 | King | ...................... B60L 3/0046 |
| | | | | 320/150 |
| 11,088,403 | B2 * | 8/2021 | Noh | ........................ H01M 10/46 |
| 11,404,729 | B2 * | 8/2022 | Kim | ....................... G01R 31/392 |
| 11,431,183 | B2 * | 8/2022 | Yen | ........................ H02J 7/0049 |
| 11,611,114 | B2 * | 3/2023 | Song | .................. H01M 10/6563 |
| 2005/0231169 | A1* | 10/2005 | Seo | ...................... H01M 10/486 |
| | | | | 374/E7.031 |
| 2013/0004811 | A1* | 1/2013 | Banerjee | ............. H01M 10/443 |
| | | | | 374/185 |
| 2019/0363407 | A1* | 11/2019 | Noh | ........................ H01M 10/46 |

(Continued)

*Primary Examiner* — Randy W Gibson
(74) *Attorney, Agent, or Firm* — Schwegman Lundberg & Woessner, P.A.

(57) ABSTRACT

An apparatus includes a battery having a battery monitoring unit (BMU) and an outer casing, and a resistance measuring device coupled to the outer casing. The battery monitoring unit and the resistance measuring device monitoring a change in surface temperature on the casing of the battery during a charging or discharging of the battery, compare the change in surface temperature with an expected change in surface temperature during the charging or discharging of the battery, and determine that a swelling of the battery has occurred when the change in surface temperature is less than the expected change in the surface temperature.

18 Claims, 4 Drawing Sheets

$$\Delta T (\delta) = T_{in} - T_{su}$$

(56) References Cited

U.S. PATENT DOCUMENTS

| | | | |
|---|---|---|---|
| 2021/0333084 A1* | 10/2021 | Ho | G01D 5/241 |
| 2022/0006315 A1* | 1/2022 | Dou | H02J 7/0071 |
| 2023/0333166 A1* | 10/2023 | Jindal | G01R 31/392 |
| 2023/0369660 A1* | 11/2023 | Lee | H01M 50/249 |
| 2024/0094300 A1* | 3/2024 | Chang | G01R 31/3865 |

* cited by examiner

MONITORING AND DETECTION OF BATTERY SWELLING

TECHNICAL FIELD

Embodiments described herein generally relate to the monitoring and detection of swelling in a battery, and in an embodiment, but not by way of limitation, the monitoring and detection of swelling in a battery by measuring temperature variation on the surface of the battery.

BACKGROUND

It has been suggested that the monitoring and detection of swelling in batteries can be accomplished by using various pressure sensors. Often pressure can be converted to some intermediate form such as displacement, and then the sensor can convert this displacement into an electrical output such as voltage or current. However, challenges remain on the actuation of the pressure sensor system due to the distance and/or gap between the battery and the pressure sensing system. Other proposed solutions to detect swelling in batteries, such as the Flexpoint Battery Expansion Sensor (BXS) (a carbon-based resistive sensor), do not require enclosure pressure to actuate, but they need electronic components and are expensive.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
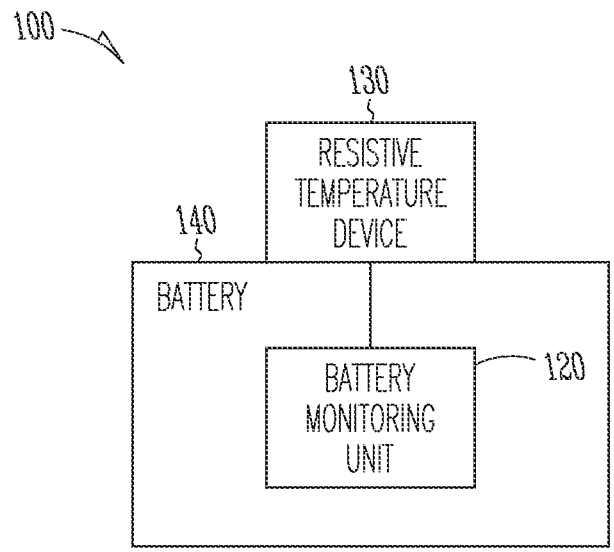
FIG. 1 is a block diagram of a battery system.

FIG. 1 is a block diagram of a typical battery system. The battery system includes a battery 100, which includes a battery casing 140 and further includes a battery monitoring unit (BMU) 120. As is known to those of skill in the art, the BMU 120 is a microprocessor-based unit that monitors the functions and operations of the battery 100. In an embodiment, a resistance temperature device 130 is attached to the battery casing 140, and electrically coupled to the BMU 120. As explained in further detail below, the temperature resistance device 130 measures changes in resistance on the casing 140 of the battery 100 during charging and discharging of the battery, and then transmits signals to the BMU 120, which can convert changes in resistance represented by the signals into changes in temperature. The surface temperature that is indirectly measured on the surface of the casing 140 of the battery is due in part to the internal temperature of the battery migrating to the surface. This internal temperature of the battery increases during the charging or discharging of the battery, and this is a perfectly normal condition. As further explained in detail below, these changes in temperature can be compared to expected or baseline changes in temperature that occur during the charging or discharging of a battery. From that comparison, it can be determined whether a swelling of the battery has occurred.

Figure 2:
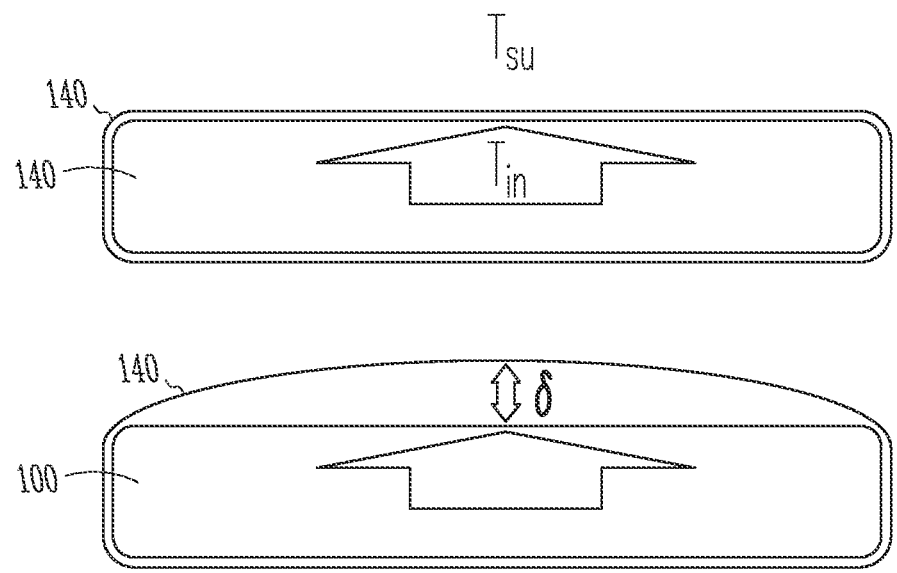
FIG. 2 illustrates a swelling condition in a battery.

FIG. 2 illustrates a swelling condition in a battery. As noted above, the battery 100 includes an outer casing 140. The top figure in FIG. 2 indicates a normal condition in a battery; that is, no swelling. In contrast, the bottom figure in FIG. 2 illustrates an abnormal swelling condition that can occur in the charging or discharging of the battery. Specifically, the abnormal creation of gases during the charging or discharging of the battery puts pressure on the casing and causes the casing to expand away from the interior of the battery, thereby creating a gap $\delta$. This gap acts as an insulator, thereby preventing the heat generated by the charging and discharging of the battery from transferring, or at least not entirely transferring, to the surface or casing of the battery. Such swelling of the battery can therefore be detected by a rise in the surface temperature of the battery that is less than expected during the charging or discharging of the battery.

Figure 3:
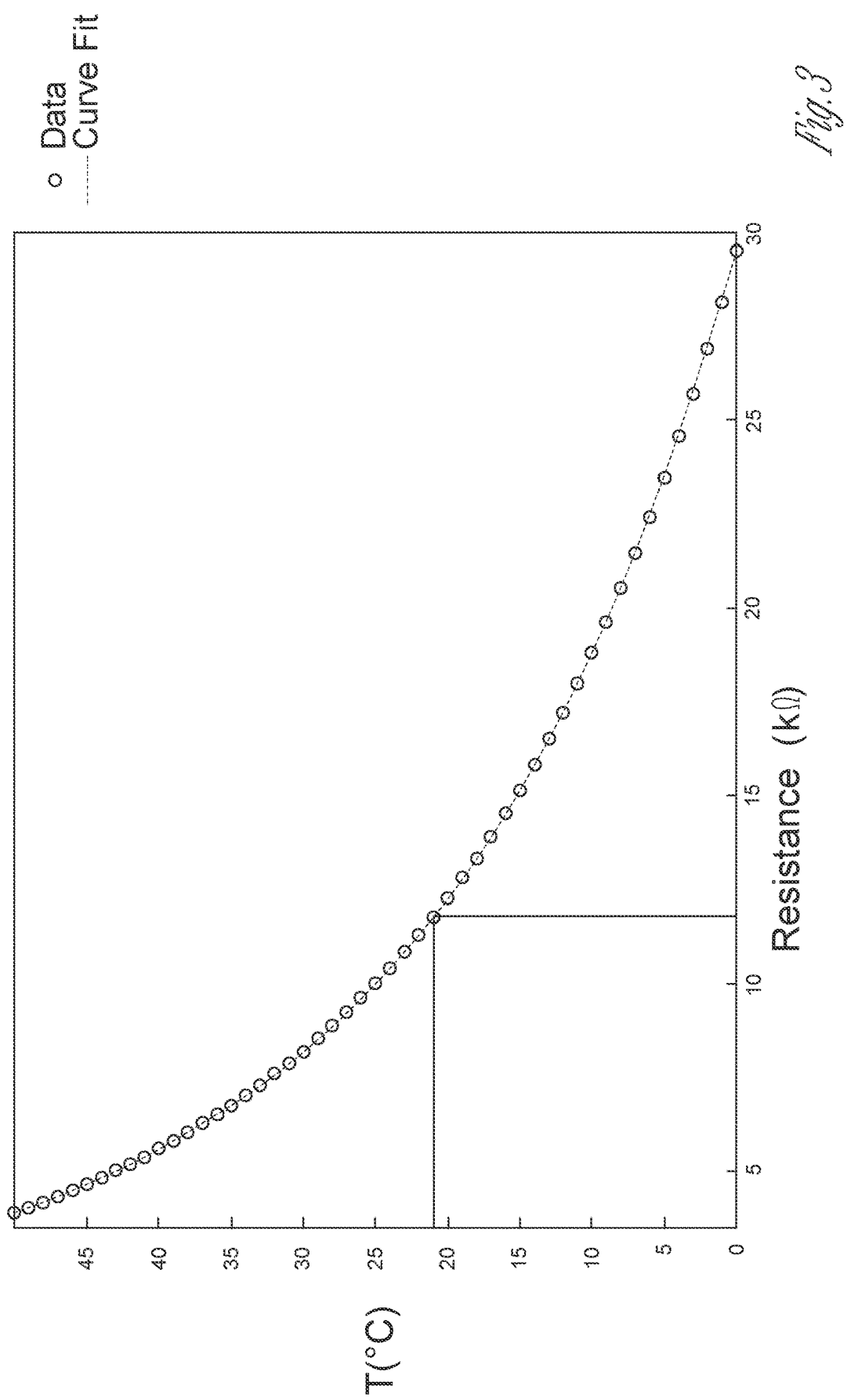
FIG. 3 is a graph illustrating the Steinhart-Hart equation and the relationship between resistance and temperature.

In an embodiment, this temperature variation on the surface of a battery can be detected using a resistance temperature device such as a thermocouple or a thermistor. The resistance that is sensed at the battery casing can then be transmitted to the BMU 120, and the BMU can convert this resistance to a temperature. This can be accomplished via a table that stores the relationship between resistance and temperature for a particular type and model of a battery. This is possible because there is a distinct relationship between resistance and temperature, as is illustrated by the graph of the Steinhart-Hart equation in FIG. 3.

Figure 4:
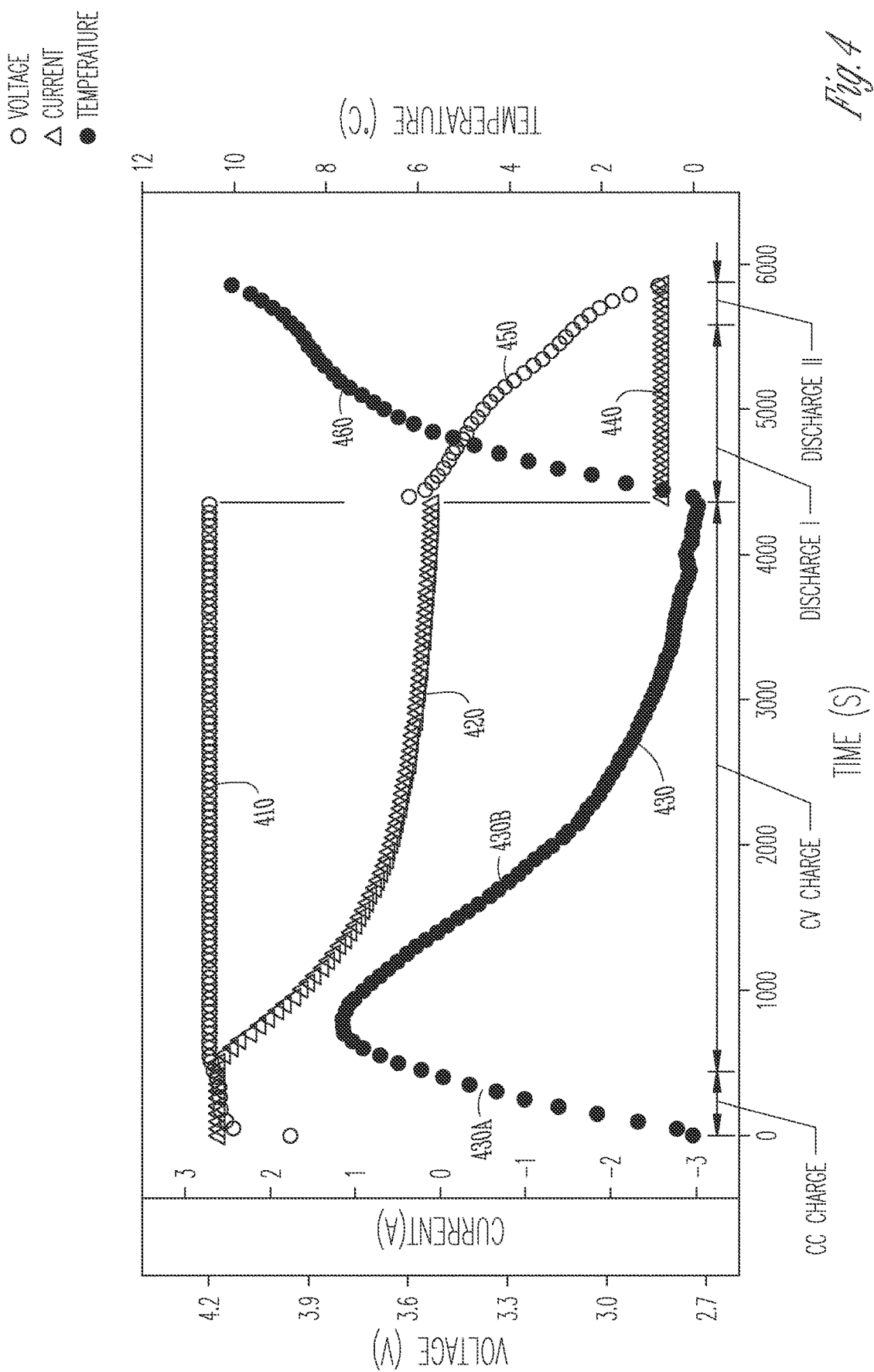
FIG. 4 is a graph illustrating the relationship between charge, voltage, and temperature in the charging of a battery.

As noted above, a certain degree of temperature increase or variation during the charging or discharging of a battery is normal. Further, the swelling of a battery during charging or discharging is a function of the charge rate, the change in voltage, and the change in temperature. FIG. 4 is a graph that illustrates this relationship between charge, voltage, and temperature in the swelling of a battery. Specifically, FIG. 4 illustrates at 410 that during the charging of a battery a constant voltage is applied to the battery, which results at 420 in a decreasing current as the battery becomes fully charged. During the charging, the temperature 430 at 430A increases very rapidly during a constant current and voltage (CC, CV) charging, and then decreases gradually at 430B. Thereafter, during discharge, a constant current is drawn from the battery at 440, which results in a gradually decreasing voltage at 450. During the discharge, there is a rather rapid rise in the internal temperature of the battery at 460. As noted, these temperature increases and decreases during charging and discharging are expected, and these temperature variations serve as a baseline.

Figure 5:
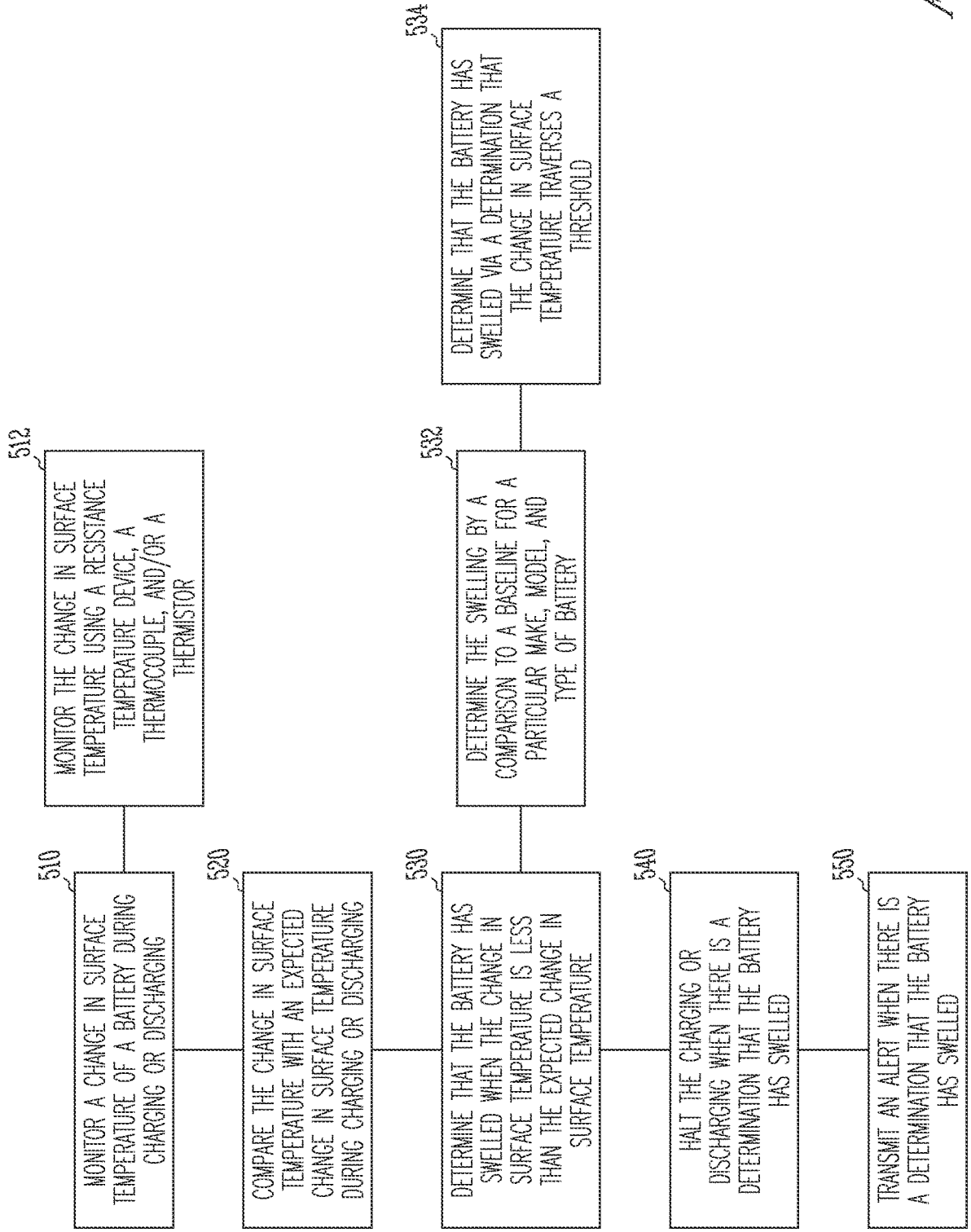
FIG. 5 is a block diagram illustrating operations and features in a system to monitor and detect swelling in batteries using temperature variation.

FIG. 5 is a block diagram illustrating operations and features in a system to monitor and detect swelling in a battery using temperature variation. FIG. 5 includes a number of process blocks 510-550. Though arranged substantially serially in the example of FIG. 5, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 5, at 510, a change in surface temperature on a casing of a battery is monitored during the charging or discharging of the battery. As indicated at 512, the change in surface temperature is monitored or measured by a resistance temperature device, a thermocouple, and/or a thermistor.

At 520, the change in surface temperature is compared with an expected change in surface temperature during the charging or discharging of the battery.

At 530, a determination is made that the battery has swelled when the change in surface temperature of the battery is less than the expected change in surface temperature. As indicated at 532, the swelling is determined by a comparison to a baseline for a particular make, model, and type of battery. The baseline is a function of a charging rate, a discharging rate, a change in voltage during the charging or discharging, and the change in surface temperature, and the baseline can be stored in a file in the BMU 120. As indicated at 534, the determination that the battery has swelled involves a determination that the change in surface temperature traverses a threshold.

As indicated at 540, the charging or discharging of the battery is halted when there is a determination that the battery has swelled, and at 550, an alert is transmitted when there is a determination that the battery has swelled.

It is noted that, the system/method of FIG. 5 does not require any modification to the BMU 120 or require an actuation like in a pressure sensing system.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to Which such claims are entitled.

The invention claimed is:

1. A process comprising:
monitoring via a computer processor a change in surface temperature on a casing of a battery during a charging or discharging of the battery;
comparing via the computer processor the change in surface temperature with an expected change in surface temperature during the charging or discharging of the battery; and
determining via the computer processor that a swelling of the battery has occurred when the change in surface temperature is less than the expected change in surface temperature.

2. The process of claim 1, wherein the change in surface temperature is measured by one or more of a resistance temperature device, a thermocouple, and a thermistor.

3. The process of claim 1, wherein the swelling is determined by comparison to a baseline for a particular make, model, and type of battery; and wherein the baseline is a function of one or more of a charging rate, a discharging rate, a change in voltage during the charging or discharging, and the change in surface temperature.

4. The process of claim 1, wherein the determining that a swelling has occurred comprises determining that the change in surface temperature traverses a threshold.

5. The process of claim 1, comprising ceasing the charging or discharging of the battery as a function of the determination that a swelling of the battery has occurred.

6. The process of claim 1, comprising transmitting an alert as a function of the determination that a swelling of the battery has occurred.

7. An apparatus comprising:
a battery comprising a battery monitoring unit (BMU) and an outer casing; and
a resistance measuring device coupled to the outer casing;
wherein the battery monitoring unit and the resistance measuring device are configured for:
monitoring a change in surface temperature on the casing of the battery during a charging or discharging of the battery;
comparing the change in surface temperature with an expected change in surface temperature during the charging or discharging of the battery; and
determining that a swelling of the battery has occurred when the change in surface temperature is less than the expected change in the surface temperature.

8. The apparatus of claim 7, comprising wherein the resistance measuring device comprises one or more of a resistance temperature device, a thermocouple, and a thermistor.

9. The apparatus of claim 7, wherein the swelling is determined by comparison to a baseline for a particular make, model, and type of battery; and wherein the baseline is a function of one or more of a charging rate, a discharging rate, a change in voltage during the charging or discharging, and the change in surface temperature.

10. The apparatus of claim 7, wherein the determining that a swelling has occurred comprises determining that the change in surface temperature traverses a threshold.

11. The apparatus of claim 7, wherein the battery monitoring unit and the resistance measuring device are configured for ceasing the charging or discharging of the battery as a function of the determination that a swelling of the battery has occurred.

12. The process of claim 1, wherein the battery monitoring unit and the resistance measuring device are configured for transmitting an alert as a function of the determination that a swelling of the battery has occurred.

13. A non-transitory machine-readable medium comprising instructions that when executed by a processor execute a process comprising:

monitoring a change in surface temperature on a casing of a battery during a charging or discharging of the battery;

comparing the change in surface temperature with an expected change in surface temperature during the charging or discharging of the battery; and determining that a swelling of the battery has occurred when the change in surface temperature is less than the expected change in surface temperature.

14. The non-transitory machine-readable medium of claim 13, wherein the change in surface temperature is measured by one or more of a resistance temperature device, a thermocouple, and a thermistor.

15. The non-transitory machine-readable medium of claim 13, wherein the swelling is determined by comparison to a baseline for a particular make, model, and type of battery; and wherein the baseline is a function of one or more of a charging rate, a discharging rate, a change in voltage during the charging or discharging, and the change in surface temperature.

16. The non-transitory machine-readable medium of claim 13, wherein the determining that a swelling has occurred comprises determining that the change in surface temperature traverses a threshold.

17. The non-transitory machine-readable medium of claim 13, comprising instructions for ceasing the charging or discharging of the battery as a function of the determination that a swelling of the battery has occurred.

18. The non-transitory machine-readable medium of claim 13, comprising instructions for transmitting an alert as a function of the determination that a swelling of the battery has occurred.

* * * * *